United States Patent [19]
DiGiovanni et al.

[11] Patent Number: 5,479,551
[45] Date of Patent: Dec. 26, 1995

[54] OPTICAL FIBER NON-RECIPROCAL PHASE SHIFTERS AND OPTICAL ISOLATORS USING THEM

[75] Inventors: David J. DiGiovanni, Montclair; Kenneth L. Walker, New Providence; Weyl-Kuo Wang, Westfield; Raymond Wolfe, New Providence, all of N.J.

[73] Assignee: AT&T Corp., Murray Hill, N.J.

[21] Appl. No.: 297,455

[22] Filed: Aug. 29, 1994

[51] Int. Cl.⁶ .................................................. G02B 6/16
[52] U.S. Cl. .................. 385/123; 385/11; 385/6; 324/244.1
[58] Field of Search ........................... 385/123, 6, 11, 385/12; 324/244.1

[56] References Cited

U.S. PATENT DOCUMENTS

| | | | |
|---|---|---|---|
| 4,850,098 | 7/1989 | Yurek | 324/244.1 |
| 4,978,189 | 12/1990 | Blonder et al. | 385/16 |
| 5,058,971 | 10/1991 | Schmitt et al. | 385/11 |
| 5,182,783 | 1/1993 | Bosc et al. | 385/123 |

OTHER PUBLICATIONS

T. G. Giallorenzi, et al. "Optical Fiber Sensor Technology", *IEEE Journal of Quantum Electronics*, vol. QE-18, No. 4, pp. 626-665 (1982).

*Primary Examiner*—John D. Lee
*Assistant Examiner*—Phan T. H. Palmer
*Attorney, Agent, or Firm*—Glen E. Books

[57] ABSTRACT

In accordance with the invention, an optical fiber phase shifter comprises a length of asymmetrical optical fiber disposed perpendicular to a magnetic field for providing a non-reciprocal phase shift. Preferably the fiber is wound in a circular coil and exposed to an axial field as from a pancake magnet. In an isolator, the fiber length and magnet strength are chosen to provide non-reciprocal phase shifts of ±45° or ±90°. The isolator including the phase shifter can be any of several configurations.

11 Claims, 2 Drawing Sheets

OPTICAL FIBER NON-RECIPROCAL PHASE SHIFTERS AND OPTICAL ISOLATORS USING THEM

FIELD OF THE INVENTION

This invention relates to optical phase shifters and, in particular, to optical fiber phase shifters based on the non-reciprocal phase shift which occurs when light in the transverse magnetic (TM) mode propagates perpendicular to a magnetic field. The device permits the fabrication of an optical isolator from optical fiber and a permanent magnet.

BACKGROUND OF THE INVENTION

Optical non-reciprocal phase shifters are useful in a variety of devices ranging from optical isolators used in telecommunications to optical gyroscopes. A non-reciprocal phase shift is a slight change in the velocity of propagation in the presence of a transverse magnetic field. This change reverses sign if either the field or the direction of light propagation is reversed. A non-reciprocal phase shifter introduces a predeterminable phase shift into an optical signal traveling in one direction but an equal phase shift of opposite sign to a signal traveling in the opposite direction.

Conventional magneto-optic isolators typically use Faraday rotation in magneto-optic materials, such as Bismuth-Yttrium Iron Garnet, to rotate the plane of polarization of linearly polarized light. This rotation is achieved by passing light through a magneto-optic body with a magnetic field parallel to the direction of light propagation. However, magneto-optic materials are expensive, and the introduction of a magneto-optic body into an optical fiber circuit presents critical alignment problems between the fiber input and the fiber output. Such a body also precludes interconnection by fusion of homogeneous materials. Accordingly, there is a need for a non-reciprocal optical fiber phase shifter which can be made of inexpensive optical fiber.

SUMMARY OF THE INVENTION

In accordance with the invention, an optical fiber phase shifter comprises a length of asymmetrical optical fiber disposed perpendicular to a magnetic field for providing a non-reciprocal phase shift. Preferably the fiber is wound in a circular coil and exposed to an axial field as from a pancake magnet. In an isolator, the fiber length and magnet strength are chosen to provide non-reciprocal phase shifts of ±45° or ±90°. The isolator including the phase shifter can be any of several configurations.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
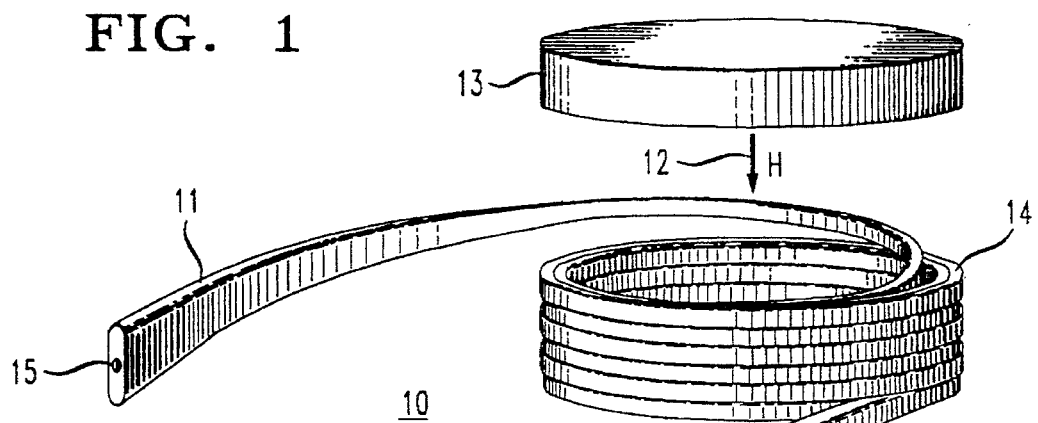
FIG. 1 is a schematic view of a non-reciprocal optical fiber phase shifting device.

Referring to the drawings, FIG. 1 is a schematic view of a non-reciprocal optical fiber phase shifting device 10 comprising a length L of asymmetric optical fiber 11 having its longitudinal direction perpendicular to the magnetic field lines 12 of a magnet 13. The fiber is preferably in the form of a circular coil 14 and the magnet 13 is preferably a permanent magnet for providing a transverse field parallel to the axis of the coil.

The fiber 11 should be asymmetric. The fiber should be an optical fiber with an asymmetric core 15 so that a TM mode can be propagated. Specifically, the core of the fiber should be asymmetric with respect to the plane defined by the axis of the core and the direction of the magnetic field H as exemplified in FIGS. 2, 3 and 4. No plane through the core parallel to H should be a plane of symmetry. The non-reciprocal phase shift does not occur for TE modes, which have only one component of the electric field. In TM modes, which have electric field components along the direction of propagation as well as perpendicular to the direction of propagation, the non-reciprocal phase shift is proportional to the Verdet coefficient of the material. The electric field parallel to the propagation direction changes sign near the middle of the core. In the symmetrical case, the non-reciprocal phase shift vanishes. It appears only when the waveguide core is asymmetrical. Fiber 11 also has an outer cladding 16 surrounding core 15. Advantageously the cladding 16 has one or more flattened surfaces 17 parallel to the plane of asymmetry of the core. Examples of suitable fiber configurations are shown in FIGS. 2–4.

Figure 2:
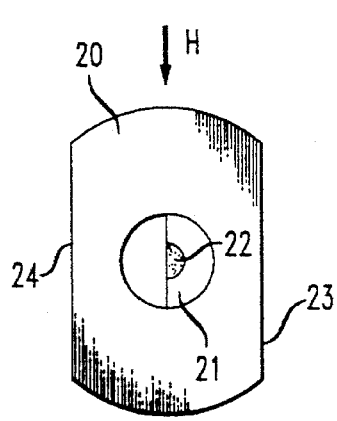
FIGS. 2–4 are schematic cross sections of different types of asymmetric fibers useful in the device of FIG. 1.

FIG. 2 is a schematic cross section of a suitable asymmetric fiber comprising an outer cladding 20, an inner cladding 21, and a core 22 which is asymmetric due, for example, to omission of part of the normal inner core/cladding structure. Conveniently, the outer cladding 20 is provided with at least one, and preferably two flattened (substantially planar) outer surfaces 23 and 24 for ensuring that the fiber can be wound into a coil without twisting so that the magnetic field H is everywhere properly aligned with respect to the asymmetric core. Specifically, no plane through the core region parallel to flattened surface 23 is a plane of symmetry. This configuration of fiber can be fabricated by grinding away part of the inner cladding/core preform before inserting it in the outer cladding for subsequent drawing. The flattened outer surfaces can be obtained by hot pressing or by grinding away portions of the outer cladding tube before drawing. As can be seen from FIG. 2, the magnetic field H is parallel to the outer flat surfaces. Computer modeling suggests that a 6 micrometer core cut approximately in half is optimal for a typical Ge-doped core in silica cladding. Rare earth doping of the core can enhance the effect.

Figure 3:
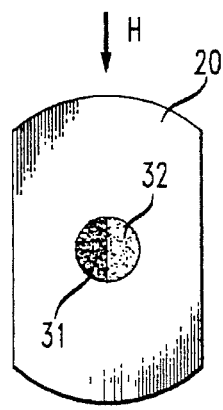

FIG. 3 is a second example of a suitable asymmetric fiber. In this embodiment, the core comprises a composite structure of portions 31 and 32 divided transverse to the plane between the two flattened surfaces. Portions 31 and 32 are materials having two different Verdet coefficients, preferably of opposite sign. For example, portion 31 can be doped with holmium, Ho, and portion 32 can be doped with ytterbium, Yb. Refractive index asymmetry is not necessary, but does enhance the effect. The FIG. 3 embodiment can be made by inserting a composite preform into an overcladding and then drawing the fiber or by asymmetric deposition of the preform core using MCVD.

Figure 4:
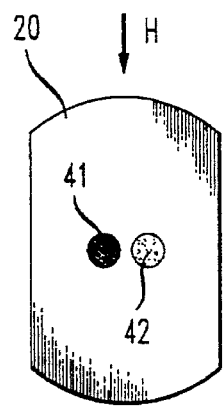

FIG. 4 is a third example of a suitable asymmetric fiber similar to the FIG. 3 embodiment except that the two core portions 41 and 42 are separated by a small thickness of cladding (desirably less than about 10 μm thick) so that the two portions are optically coupled. Core portions 41 and 42 have different Verdet coefficients. For ease of splicing to a normal fiber, it is advantageous that one core be central and that the other be off-center.

While not necessary for the invention, the following sets forth applicants' best understanding of the operation of the inventive optical fiber non-reciprocal phase shifter. The phase shifter is based on the non-reciprocal phase shift experienced by light propagating in the transverse magnetic (TM) mode with a magnetic field perpendicular to the light propagation direction and to the E-field of the mode. The non-reciprocal phase shift is a slight change in the velocity of propagation in the presence of a transverse magnetic field. This change reverses sign if either the field or the direction of light propagation is reversed. It does not occur for TE modes which have only one component of the electric field, parallel to the surface in a planar waveguide. In TM modes, which have electric field components along the direction of propagation as well as perpendicular to the surface, the non-reciprocal phase shift is proportional to the Faraday rotation effect or the Verdet coefficient of the material. The electric field parallel to the propagation direction changes sign near the middle of the waveguide. In the symmetrical case where the substrate and the cover of the active planar waveguide are the same, the non-reciprocal phase shift vanishes. It appears only when the waveguide is asymmetrical due to different refractive indices above and below the active layer, or is a two-layer active guide with different Verdet coefficients or refractive indices in the two layers. In the present invention, the planar waveguide is replaced by a glass fiber with an asymmetrical core.

In the planar waveguide case, even with air as the cover and a substrate material similar to the waveguide film, this non-reciprocal phase shift effect is about ten times smaller than the Faraday effect in the same material. A typical non-reciprocal phase shift device is therefore about an order of magnitude longer than a Faraday device. The magneto-optic effects in silica glass or even in rare-earth doped glass are much smaller than those in materials such as Bismuth-Yttrium Iron Garnet. The length of a glass fiber device will therefore be many meters instead of the several millimeter lengths typical of garnet devices. But the fiber can be wound into a compact coil and magnets to provide a field perpendicular to this coil can also be compact and inexpensive.

A glass fiber can be made asymmetric by any of the structures shown in cross section in FIGS. 2–4. In each case, the TM modes are those that have their principal electric fields in the horizontal direction. The applied magnetic field is vertical in each case. The flattening of the fibers assures that when the fibers are wound into coils, this field will always be properly oriented when it is applied parallel to the axis of the coil.

Computer modeling suggests that, in a field of 1 kilo-oersted, (easily provided by inexpensive permanent magnets), the required length to achieve 90° of phase shift would be a few meters for heavily rare-earth doped fiber and about 100 meters for a fiber lightly doped with a paramagnetic ion.

Figure 5:
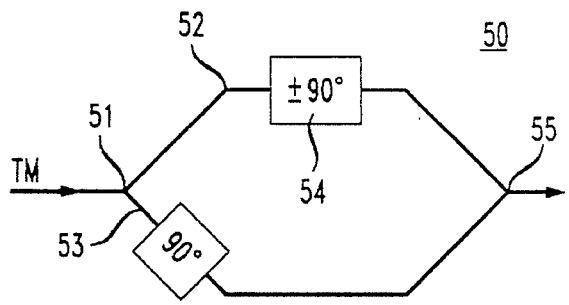
FIGS. 5–8 are schematic diagrams of different types of optical isolators employing the device of FIG. 1.

FIG. 5 illustrates a first embodiment of an optical fiber isolator 50 comprising an input 3 dB splitter 51 for dividing an input beam equally into a pair of optical fiber paths 52 and 53. One path 52 includes a non-reciprocal phase shifter 54 of the type shown in FIG. 1 for providing a ±90° non-reciprocal phase shift (i.e. a ±90° phase shift in one direction and a −90° phase shift in the opposite direction). The other path 53 has a path length providing a 90° phase shift with respect to the first path (in the absence of a magnetic field). Path 53 is preferably of polarization preserving fiber. The two paths terminate in an output 3 dB coupler 55.

In operation a plane polarized wave enters at splitter 51 and splits equally between paths 52 and 53. Both paths provide a 90° phase shift so the waves recombine in phase at coupler 55 and propagate undiminished. Linearly polarized light entering coupler 55 in the reverse direction splits equally between paths 52 and 53, but incurs different phase shifts in the two paths. Specifically, it incurs a −90° phase shift in path 52 and +90° in path 53. So the two paths destructively interfere at splitter 51 (which acts as a coupler for this direction of propagation) and substantially no return light leaves the device.

Figure 6:
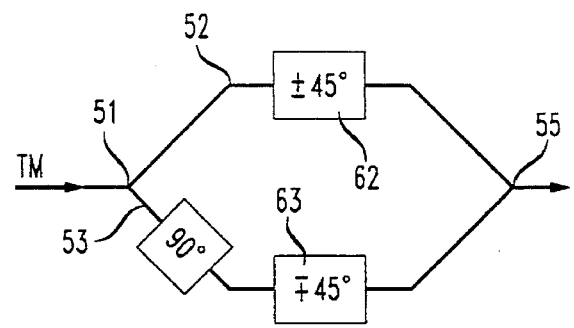

FIG. 6 illustrates an alternative isolator which is similar to the FIG. 5 embodiment except that instead of a 90° non-reciprocal phase shifter in one arm, 45° phase shifters 62 and 63 are disposed in paths 52 and 53 respectively. The phase shifters 62 and 63 are of opposite orientation (oppositely wound coils) to give a total phase shift of 90°. The advantage of this embodiment is that the two oppositely oriented coils can be wound on the same form to avoid any temperature differences between the paths 52 and 53.

Figure 7:
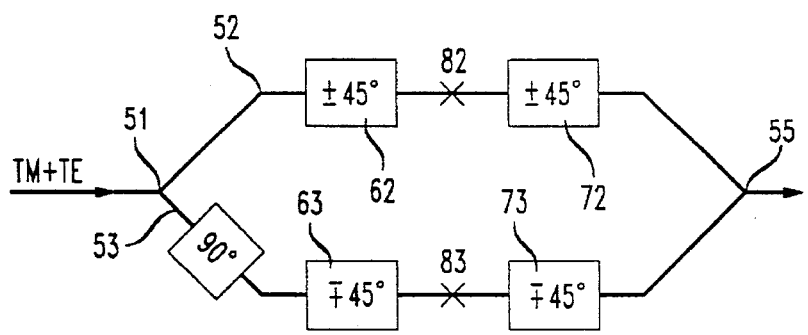

The isolators of FIGS. 5 and 6 are suitable for linearly polarized light. To make a polarization-independent version, the isolator of FIG. 6 can be modified to structure of FIG. 7. This isolator employs two 45° phase shifters in each path, specifically phase shifters 62, 72 in path 52 and 63, 73 in path 53. The phase shifters in the respective paths are oppositely oriented, i.e. 62 and 72 are wound oppositely from 63 and 73. And between the two phase shifters in each path, the fiber is cleaved and respliced with a 90° turn, so that the TM orientation is convened to the TE mode and vice versa. The resplice in arm 52 is designated 82, and the resplice in arm 53 is 83. Another coil of the same orientation follows after the resplice in each arm. Since unpolarized light is composed of a mixture of these two modes, the first phase shifters in each arm serve to isolate the TM component which then becomes the TE mode and is not affected by the second phase shifter. Similarly, the incoming TE component is not affected by the first phase shifter, but then becomes the TIM mode and is isolated by the second coils.

Figure 8:
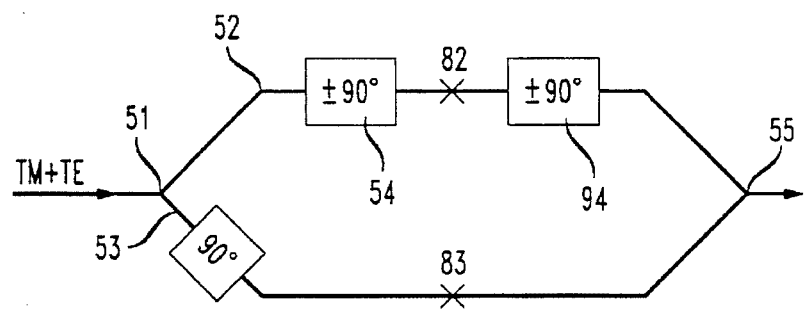

As shown in FIG. 8, the isolator of FIG. 5 can be similarly modified to a polarization-independent version by adding resplices in paths 52, 53 before coupler 55 and adding another 90° non-reciprocal phase shifter 94 in path 52 between the resplice and coupler 55.

The non-reciprocal optical fiber phase shifters of FIG. 1 can also be used in optical circulators. For example, the optical isolators of FIGS. 5, 6, and 7 can be converted into optical circulators by substituting four port 3 dB couplers for the three port 3 dB couplers 51 and 52.

The non-reciprocal phase shifters of FIG. 1 can also be used in optical fiber gyroscopes based on the Sagnac effect. Such gyroscopes use optical fiber coils with light traveling in opposite directions. One or more phase shifters optimally totaling 90° between the oppositely directed beams will enhance the sensitivity of the gyroscope to accelerations. See T. G. Giallorenzi et al. "Optical Fiber Sensor Technology", *IEEE Journal of Quantum Electronics*, Vol. QE-18, No. 4, (April, 1982) which is incorporated herein by reference.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

We claim:

1. An optical fiber non-reciprocal phase shifting device comprising:

a length of optical fiber having a core and a cladding and a longitudinal direction for light propagation;

a magnet for applying a magnetic field to said optical fiber in a direction transverse to said longitudinal direction; said longitudinal direction and the direction of said magnetic field defining a plane; and said core being asymmetric with respect to said plane for producing a non-reciprocal phase shift in light propagating through said fiber.

2. A device according to claim 1 wherein said length of optical fiber is in the form of a coil and said magnetic field is in the direction of the axis of said coil.

3. A device according to claim 1 or 2 wherein the cladding of said optical fiber is provided with one or more planar surfaces.

4. A device according to claim 2 wherein said cladding is provided with at least one flattened surface and said coil is wound with said flattened surface parallel to the direction of said magnetic field.

5. An optical fiber Sagnac effect gyroscope comprising an optical fiber non-reciprocal phase shifting device according to claim 1 or claim 2.

6. A device according to claim 1 or 2 wherein said core is asymmetric due to the presence of two different materials forming two different parts of the core.

7. A device according to claim 1 or 2 wherein said core is asymmetric due to the presence of two different materials forming two different parts of the core separated by a sufficiently small thickness of cladding that the two parts are optically coupled.

8. An optical isolator comprising an optical fiber non-reciprocal phase shifting device according to claim 1 or claim 2.

9. An optical fiber circulator comprising an optical fiber non-reciprocal phase shifting device according to claim 1 or claim 2.

10. An optical fiber comprising a cladding and a core and a longitudinal direction for light propagation;

said cladding having at least one flattened surface; and said core having no plane parallel to said flattened surface which is a plane of symmetry, wherein said core is asymmetric due to the presence of two different material forming two different parts of the core.

11. An optical fiber according to claim 10 wherein said two different parts of the core are separated by a sufficiently small thickness of cladding that the two parts are optically coupled together.

* * * * *